PALMER M. MAXWELL
INVENTOR

BY Newton, Hopkins, Jones & Ormsby
ATTORNEYS

June 13, 1967 P. M. MAXWELL 3,325,756

REMOTELY CONTROLLED MAGNETIC ELECTRIC SWITCH

Filed Nov. 8, 1965 4 Sheets-Sheet 2

PALMER M. MAXWELL
INVENTOR

BY Newton, Hopkins, Jones & Ormsby
ATTORNEYS

June 13, 1967 P. M. MAXWELL 3,325,756

REMOTELY CONTROLLED MAGNETIC ELECTRIC SWITCH

Filed Nov. 8, 1965

4 Sheets-Sheet 3

PALMER M. MAXWELL
INVENTOR

BY Newton, Hopkins, Jones & Ormsby
ATTORNEYS

June 13, 1967 P. M. MAXWELL 3,325,756

REMOTELY CONTROLLED MAGNETIC ELECTRIC SWITCH

Filed Nov. 8, 1965

4 Sheets-Sheet 4

PALMER M. MAXWELL
INVENTOR

BY Newton, Hopkins, Jones & Ormsby
ATTORNEYS 3,325,756

REMOTELY CONTROLLED MAGNETIC ELECTRIC SWITCH

Palmer M. Maxwell, 212 E. Liberty St., Savannah, Ga. 31401

Filed Nov. 8, 1965, Ser. No. 506,680
11 Claims. (Cl. 335—205)

The present invention relates to an electrical switching mechanism, and more particularly, to a hermetically sealed electrical switching mechanism wherein the movement of the actuating arm of the switch is controlled by a means mounted external to the sealed switch.

Electrical apparatus is widely used by industry, municipalities and educational institutions in potentially hazardous environments wherein sparking may set off explosions and fires. In use of this apparatus it is necessary that electrical switches, which are inherent sources of sparking, be completely sealed from the environmental surroundings. Electrical switches of this type are commonly referred to as hermetically sealed switches.

It is difficult, in hermetically sealed electrical switching mechanisms, to provide positive control over the actuating arm of the switch due to the hermetic sealing requirement. Direct mechanism linkages attached to the actuating arm provide the necessary positive control, but during extended use complete sealing of the switch becomes unreliable. In addition, the life of these mechanical linkages is relatively short due to the comparative large number of moving parts.

The present invention provides a remotely located external positive control means over the movement of the actuating arm located within a hermetically sealed electrical switch. Briefly described, the present invention provides the actuating arm of a hermetically sealed electrical switch with a movement inducing means responsive to magnetic forces. In addition, a magnetic means movable between several positions is mounted external to the hermetically sealed electrical switch but in proximate relationship to the movement inducing means of the internal actuating arm. Movement of the external magnetic means induces a corresponding movement in the actuating arm. The external magnetic means may be easily moved between its positions by a simple mechanical means since there is no requirement for it to be sealed. As a result, all possible sources of sparking are located within the heremetically sealed switch and a reliable seal is maintained throughout the use of the switch. Also, due to the simplicity of required movable parts, the life of the complete switching mechanism is extended.

Therefore, it is an object of the present invention to provide a hermetically sealed electrical switching mechanism wherein the movement of the actuating arm is positively controlled by remote means mounted completely external to the sealed switch.

Another object of the present invention is to provide a hermetically sealed electrical switching mechanism wherein the actuator arm is remotely controlled by magnetic means.

A further object of the present invention is to provide a hermetically sealed electrical switching mechanism wherein the actuating arm is provided with movement inducing means responsive to magnetic forces and whose movement is remotely controlled by magnetic means located externally of the sealed switch.

Another object of the present invention is to provide a positively controlled electrical switching mechanism wherein all sources of sparking are located within a permanently sealed housing.

Another object of the present invention is to provide a hermetically sealed electrical switching mechanism wherein all possible hazardous conditions created by sparking are eliminated.

Another object of the present invention is to provide an electrical switch having an actuating arm upon which is secured a movement inducing magnet completely sealed within a housing and a magnetic means external of the housing for remotely inducing movement of the actuating arm.

These and other objects of the present invention will become apparent from the following detailed description and accompanying drawings wherein.

Figure 1:
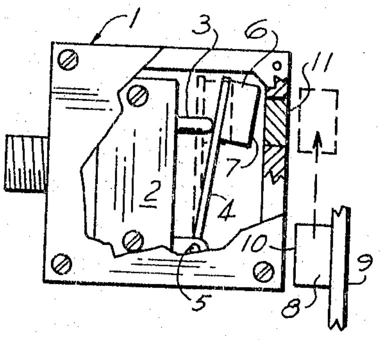
FIG. 1 is a view in partial section of one embodiment of a hermetically sealed switching mechanism of the present invention and the manner in which it operates.

Referring first to FIG. 1, there is shown a hermetically sealed housing 1 having mounted therein an electrical switch 2. The electrical switch has an operating contact 3 extending from one end thereof and an actuator arm 4 pivotally mounted thereon at a point 5 displaced from the operating contact. The actuator arm is mounted in such manner as to be pivotally movable against and to depress the operating contact which is spring loaded. Mounted at the free end of the actuator arm is a member 6 responsive to magnetic forces. In the embodiment shown, the member 6 is a magnet having an outer surface 7 of a particular magnetic polarity which extends into a zone Z in the vicinity of the top of the housing 1. When a magnetic force is extended into the zone Z it is effective to activate the magnet 6 through its surface 7.

It is emphasized that in some embodiments the members need not be magnets. For example, if magnetic forces of attraction in the zone Z to induce movement in the actuator arm the member 6 need only be of a magnetizable material.

External of the hermetically sealed housing 1 and proximate to the actuator arm 4 is a movement inducing control means comprising a magnet 8 mounted in a movable fashion on plate 9 only part of which is shown. Magnet 8 has an outer surface 10 which has a magnetic polarity which is the same as the polarity of surface 7 of member 6 and which can be passed through the zone Z. In practice the member 8 would be contained within a suitable mounting, however, for the sake of simplicity in illustrating the operation of the present invention, such mounting has been omitted.

In the operation of this embodiment of the present invention, magnet 8 is moved in a direction indicated by the arrow shown in FIG. 1 through the zone Z to a position represented by the dotted line. At the same time, the actuator arm 4 is caused to pivot to a new position shown by its corresponding dotted line. In this new position the operating contact 3 is depressed by the actuator arm. Movement of the actuator arm is caused by the repulsion forces between the surfaces 7 and 10 having the same magnetic polarity. When magnet 8 is moved back to its original position through the zone Z, actuator arm 4 is caused to return to its original position by the spring action of the operating contact 3 since the magnetic forces of repulsion become diminished. It should be understood that the movement of the operating contact between its extended and depressed positions results in a circuit being opened and closed.

Another feature of the embodiment just described is the presence of a soft iron core 11. This core is positioned in the wall of the hermetically sealed housing 1 in such a manner as to lie between member 6 and magnet 8 when they are in position opposite each other shown by the dotted lines. The soft iron core 11 thus acts to increase the flux density or concentrate the magnetic forces between surfaces 7 and 10. As a result, the actuator arm 4 is more positively moved and maintained in position.

Figure 2:
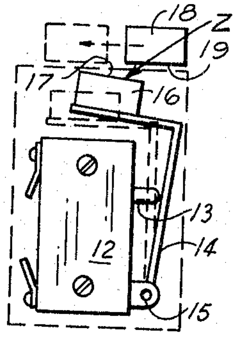
FIG. 2 is a view of another embodiment of the present invention similar to that of FIG. 1 except that a different actuating arm in the hermetically sealed eletcrical switch is employed.

The device illustrated in FIG. 2 is much the same as that in FIG. 1 with the exception that a different actuator arm is employed with the electrical switch. As shown therein, an electrical switch 12 is contained within a hermetically sealed housing represented by the dotted peripheral line. Near one end of the switch 12 is an operating contact 13 while near the opposite end is an L-shaped actuator arm 14 pivotally mounted at 15. A member 16 responsive to magnetic forces is mounted at the extreme free end of the actuator arm. As in the device of FIG. 1, member 16 is a magnet having an outer surface 17 of a particular magnetic polarity. Mounted external to the sealed housing, but in proximate relationship to member 16, is a magnet 18 having a surface 19 of a magnetic polarity which is the same as that of surface 17.

In the operation of this switch, magnet 18 is moved in the direction indicated by the arrow in FIG. 2 to a position shown by the corresponding dotted line. At the same time, the repulsion forces between surfaces 17 and 19 cause actuator arm 14 to pivot to a position indicated by its corresponding dotted line. This, in turn, results in operating contact 13 being depressed and activation of an electrical circuit. When magnet 18 is returned to its original position the actuator arm 14 also returns to its original position due to the spring action of the operating contact.

Figure 3:
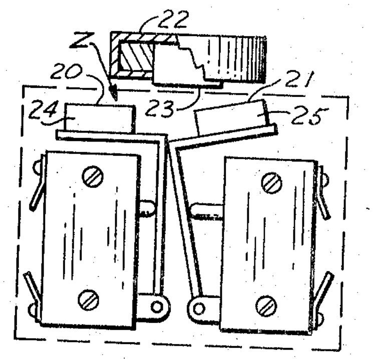
FIG. 3 is a view showing the manner in which the present invention may be employed using an arrangement of two of the hermetically sealed electrical switches shown in FIG. 2.

Two electrical switches of the type having L-shaped actuator arms described in FIG. 2 are shown in face-to-face relationship in FIG. 3. Surrounding these switches is the usual hermetically sealed housing represented only by a peripheral dotted line. Both switches are of the same structure as that described in FIG. 2 with the exception that the surface 20 of the member 24 attached to the actuator arm is of opposite magnetic polarity to the surface 21 of the member 25 attached to the other actuator arm. External to the hermetically sealed housing, but in proximate relationship to the members 24 and 25, is mounted an electromagnet 22. This magnet may be permanently mounted in a central position with respect to the two switches and their corresponding actuator arms. The lower surface 23 of the electromagnet is provided with a magnetic polarity which may be varied by changing the direction of flow of current in the magnet as is well known in the art.

In the operation of the switching mechanism as illustrated in FIG. 3, it should be apparent that with any particular magnetic polarity of surface 23 there is set up a magnetic attraction for that surface, 20 or 21, of members 24 or 25 which is of opposite magnetic polarity and there is set up a magnetic repulsion for that surface, 20 or 21, of members 24 or 25 which is of the same magnetic polarity. As illustrated, surface 23 and surface 21 are of opposite magnetic polarities while surface 23 and surface 20 are of the same magnetic polarity. Reversing the current in electromagnet 22 would cause the members 24 and 25 to change positions as well as their corresponding actuator arms.

An additional feature of this arrangement of these switches is provided by having the actuator arms slide in contact with one another. This contact further aids in stabilizing the positions assumed by the actuator arms during operation of the switching mechanism.

Figure 4:
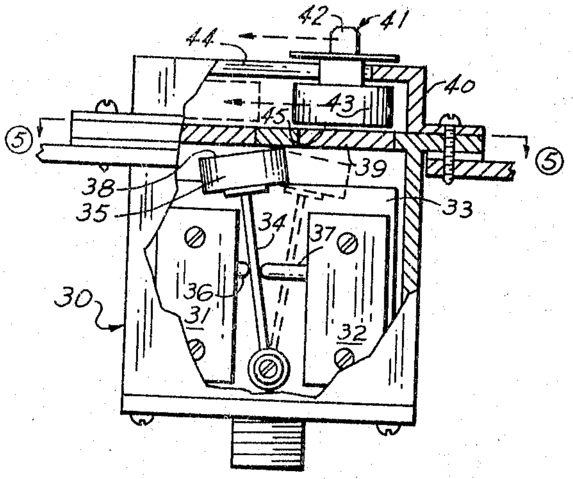
FIG. 4 is a view in partial section of another embodiment of the present invention wherein two electrical switches are alternately activated by a single actuator arm and the external control magnet is mounted within a cap attached to the hermetically sealed housing.

In another embodiment of the present invention, as illustrated in FIG. 4, there is provided a hermetically sealed housing 30 having two electrical switches 31 and 32 mounted on an upright plate 33 within the housing. Operating contacts 36 and 37 extend toward each other from the sides of the electrical switches which face each other. Also mounted on upright plate 33 is an actuator arm 34. The actuator arm is positioned midway between and adapted to engage the operating contacts 36 and 37 when pivoted through a small arc on its mounting. As a result, the operating contacts are alternately depressed. The relative positioning of the operating contacts, of course, determines whether an electrical circuit is open or closed.

A member 35, responsive to magnetic forces, is secured to the upper free end of the actuator arm. This member may be made of a magnetizable material or may be actually magnetized so that surface 38 has a particular magnetic polarity. The precise selection will be dependent upon whether magnetic forces of attraction or repulsion are being employed and also the particular magnetic polarity of surface 45 of control magnet 43.

Secured to the outer surface of hermetically sealed housing 30 and in proximate relationship to member 35 is a mounting cap 40 for control means 41. The control means comprises a control magnet 43 contained within the cavity of cap 40 and which has a knob 42 attached thereto through slot 44. The control magnet is provided with a surface 45 of a particular magnetic polarity and may be moved back and forth in slot 44 of the mounting cap by means of knob 42.

The particular magnetic arrangement illustrated, for example only, shows surface 38 of member 35 as having a magnetic polarity which is the same as the magnet polarity possessed by surface 45 of control magnet 43.

In the operation of the illustrated switching mechanism, magnet 43 is moved in the direction indicated by the arrows to a position defined by the dotted line. During this movement magnetic forces of repulsion are set up between surface 45 and surface 38 and cause the actuator arm 34 to pivot to a new position shown by the corresponding dotted line. The movement of the actuator arm causes operating contact 37 to be depressed while the operating contact 36 becomes completely extended due to spring loading. Movement of the magnet 43 back to its original position again sets up repulsion forces between surfaces 38 and 45 causing the return of actuator arm 34 to its original position.

Figure 5:
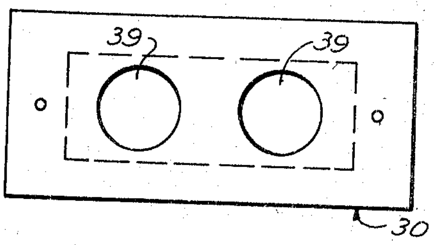
FIG. 5 is a view taken along line 5—5 of FIG. 4 showing the upper surface of the hermetically sealed housing having the soft iron discs mounted therein.

Soft iron discs 39 may be placed in the wall of hermetically sealed housing 30 lying between magnet 43 and member 35. As explained before, the soft iron discs cause the flux density to increase by concentrating the magnetic lines of force. Two such discs may be employed, one in each operating position. Fig. 5 illustrates more clearly the positioning of the soft iron discs 39.

Figure 6:
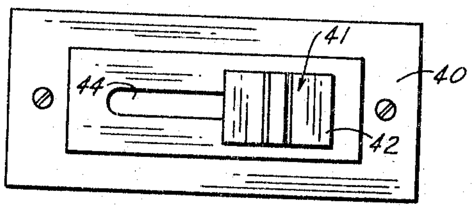
FIG. 6 is a top view of the embodiment of the present invention shown in FIG. 4 depicting the knob control means for the control magnet.

The top mounting cap 40 is more fully illustrated in FIG. 6 wherein knob 42 is shown positioned for movement within slot 44.

Figure 7:
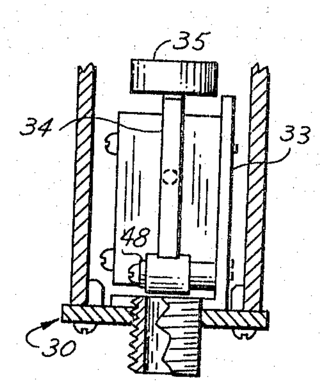
FIG. 7 is a partial view in partial section showing the manner in which the actuator arm of the embodiment in FIG. 4 is mounted within the hermetically sealed housing.

The mounting for the electrical switches and the actuator arm within hermetically sealed housing 30 are shown in more detail in FIG. 7. The electrical switches are suitably mounted by means of screws onto the upright plane 33. The actuator arm 34 is pivotally mounted by one end of a bushing 48 which also acts as a bearing. This arrangement is in turn mounted by means of a screw and spacer onto the upright plate.

Figure 9:
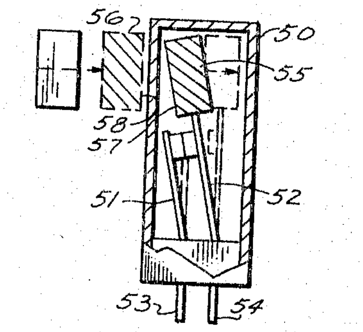
FIG. 9 is a partial sectional view of the embodiment shown in FIG. 8 illustrating the manner of operation of the switch.
Figure 8:
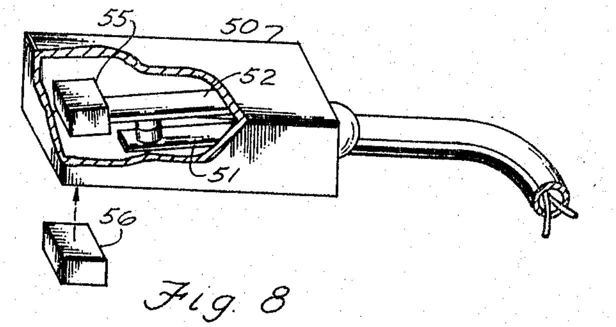
FIG. 8 is a perspective view in partial section of another embodiment of the present invention wherein a simple leaf-spring switch is employed.

Another embodiment of the present invention is illustrated in FIGS. 8 and 9, wherein simple, leaf-spring contactors are employed. In the structure shown there is a small hermetically sealed housing 50 having leaf-spring contactors 51 and 52 mounted therein. These leaf-spring contactors are connected to exterior keys 53 and 54 extending from the hermetically sealed housing 50. These lugs serve as an easy and efficient means for attaching the switching mechanism to a circuit. One of the leaf-spring contactors 52 is secured at its upper end a member 55 which is responsive to magnetic forces of attraction.

In the normal position, leaf-spring contactors 51 and 52 extend in a straight vertical position separated from each other. Upon movement of a magnet 56 to a proximate position adjacent the surface of the hermetically sealed housing 50 and opposite the member 55, magnetic forces of attraction are set up and member 55 moves towards the magnet 56. This movement of member 55 in turn causes leaf-spring contactor 52 to pivot into contact with leaf-spring contactor 51. Upon withdrawal of magnet 56 leaf-spring contactors 51 and 52 resume their normal separated upright positioning.

An obvious variation to the structure just described involves magnetizing member 55 wherein the surface 57 is provided with a particular magnetic polarity. In addition, the surface 58 of magnet 56 is provided with a magnetic polarity that is opposite to that of surface 57. As a result, a strong magnetic attraction will be set up between surfaces 57 and 58 causing movement between the leaf-spring contactors similar to that described above.

Figure 10:
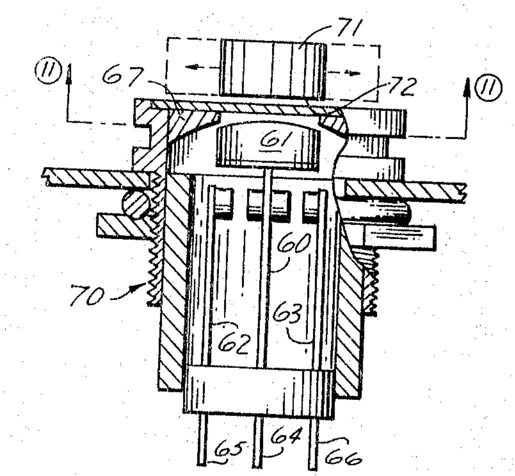
FIG. 10 is a view in partial section of another embodiment of the present invention wherein a multiple leaf-spring switch is employed.

A multiple leaf-spring contactor structure may also be employed in the present invention as illustrated in FIG. 10. Within a hermetically sealed housing 70 is mounted a central leaf-spring contactor 60 having mounted on its upper free end a member 61 which is responsive to magnetic forces of attraction or repulsion. The central leaf-spring contactor is flanked by leaf-spring contactors 62 and 63 on either side. Leaf-spring contactors 60, 62 and 63 are connected, respectively, to external lugs 64, 65 and 66 which extend outwardly from the hermetically sealed housing 70 in proximate relationship to member 61 is a magnet 71 mounted for movement in the directions indicated by the arrows. The lower surface 72 of magnet 71 possesses a particular magnetic polarity. As described in previous embodiments, when magnet 71 is moved a corresponding movement is produced in member 61 due to the magnetic forces set up between lower surface 72 of magnet 71 and the member 61. The movement of member 61 in turn causes the leaf-spring contactor 60 to pivot through a small arc and thereby electrically contact one of the flanking leaf-spring contactors 62 or 63. The variations of this magnetically induced movement will be described in more detail with respect to FIGS. 13 through 17.

Figure 11:
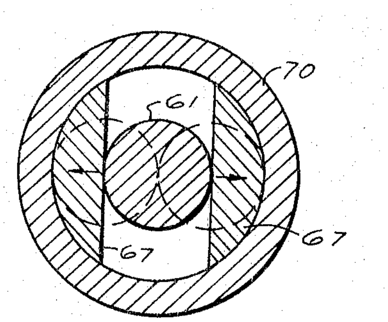
FIG. 11 is a view taken along line 11—11 of FIG. 10 showing the internal upper surface of the hermetically sealed housing.

Similar to the switching mechanisms discussed with respect to FIGS. 1 through 5, soft iron segments 67 are placed along opposite sides and within the hermetically sealed housing 70. These segments are so located as to lie between the magnet 71 and the member 61 when contact is made between leaf-spring contactor 60 and one of the flanking leaf-spring contactors. This is shown in further detail in FIG. 11 wherein the dashed lines represent the extreme positions of the member 61 when the leaf-spring contactors are in contact. As explained previously, these soft iron segments serve to increase the flux density by concentrating the magnetic lines of force between the lower surface 72 of magnet 71 and the member 61. As a result, member 61 is held more strongly in the regions where these segments are located.

Figure 12:
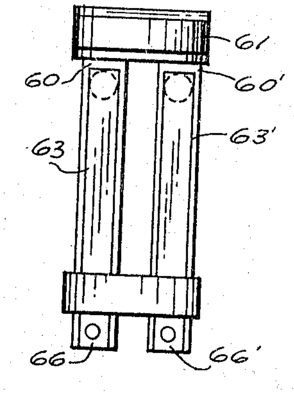
FIG. 12 is a view showing a possible variation in the multiple leaf-spring switch of the type shown in FIG. 10.

Each leaf-spring contactor arrangement as shown in FIG. 10 need not be a single set of contactors but may be a series of leaf-spring contactor sets arranged in line in spaced-apart relationship such as shown in FIG. 12. Therein is shown a double series of central leaf-spring contactors 60 and 60' having a single elongated central member 61 attached at their upper free ends and responsive to magnetic forces. Each of these central spring leaf-contactors is flanked by two other leaf-spring contactors, only one 63 and 63' of which is shown for each central leaf-spring contactor. Lugs 66 and 66' are also shown which correspond to flanking leaf-spring contactors 63 and 63'.

The device shown in FIG. 10 may be operated by employing magnetic forces of attraction or by magnetic forces of repulsion. Each of these systems will presently be described.

Figure 13:
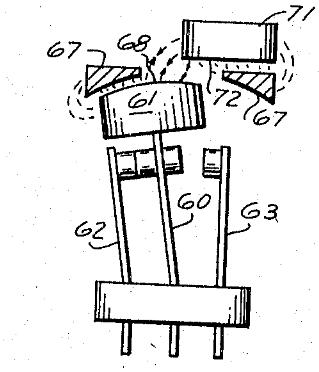
FIGS. 13 and 14 are views schematically illustrating the operation of the electrical switch employed in FIG. 10 wherein magnetic forces of repulsion are employed to induce movement of the actuator arm.
Figure 14:
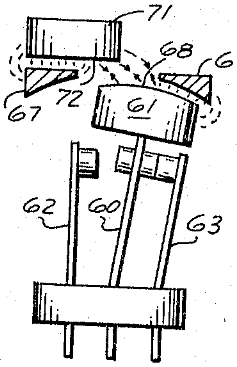

The magnetic repulsion system of operation is shown in detail in FIGS. 13 and 14. This system necessitates the use of a magnet for member 61 mounted on the central leaf-spring contactor 60. The upper surface 68 of this magnet possesses a magnetic polarity which is the same as that possessed by the lower surface 72 of the control magnet 71. When the control magnet 71 is positioned as shown in FIG. 13 the magnetic forces of repulsion cause the magnetized member 61 to move in the opposite direction. This movement in turn causes central leaf-spring contactor 60 to pivot into electrical contact with the flanking leaf-spring contactor 62. As long as magnet 71 is maintained in that position the leaf-spring contactors 60 and 62 remain in contact due to the continuing repulsive forces acting between magnetized member 61 and the control magnet.

Upon movement of the control magnet 71 to the other side as shown in FIG. 14, the magnetized member 61 takes up a new position on the opposite side. This in turn results in central leaf-spring contactor 60 moving out of electrical contact with flanking leaf-spring contactor 62 and into electrical contact with flanking leaf spring contactor 63. Again, electrical contact is maintained as long as control magnet 71 remains in position.

It is essential to the operation of this system that member 61 be magnetized and have an upper surface 68 of a like magnetic polarity as the lower surface 72 of the control magnet.

Figure 15:
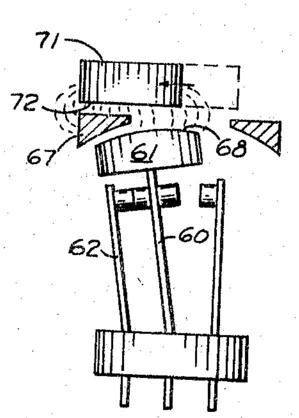
FIGS. 15 to 17 are views schematically illustrating the manner of operation of the electrical switch shown in FIG. 10 wherein magnetic forces of attraction are employed to induce movement of the actuator arm.
Figure 16:
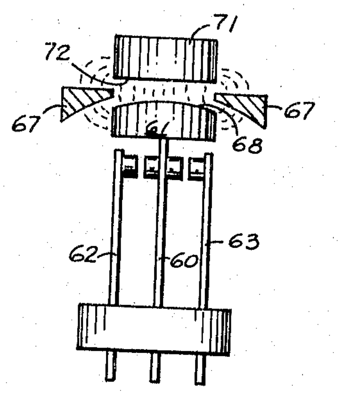
Figure 17:
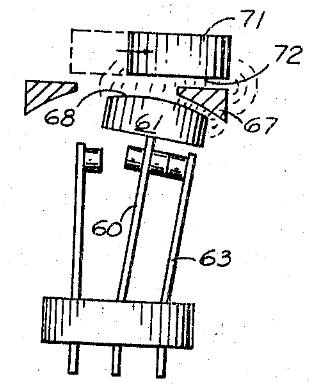

The system which operates on magnetic forces of attraction is illustrated in FIGS. 15 through 17. In this system member 61 may be either magnetized or be of a material which is responsive to magnetic forces. If the member 61 is magnetized it must be provided with an upper surface 68 having a magnetic polarity which is opposite to the polarity of lower surface 72 of control magnet 71. A stronger magnetic field and increased forces of attraction will occur if member 61 is magnetized.

In the operation of this system, movement of the control magnet 71 to a position as shown in FIG. 15 induces a corresponding movement of member 61 in the same direction due to the magnetic forces of attraction which are set up. Soft iron segment 67 aids in concentrating these magnetic forces thus increasing the flux density. Movement of the member 61 causes central leaf-spring contactor 60 to pivot through a small arc into electrical contact with flanking leaf-spring contactor 62. As long as control magnet 71 is maintained in this position, electrical contact between leaf-spring contactors 60 and 62 will be maintained due to the continuing action of the magnetic forces of attraction.

Movement of control magnet 71 to a central position as shown in FIG. 16 again results in a corresponding movement by member 61. This, in turn, causes central leaf-spring contactor 60 to move out of electrical contact with leaf-spring contactor 62. In this position no electrical contact is made between any of the leaf-spring contactors 60, 62 or 63. The magnetic forces of attraction between the lower surface 72 of control magnet and the upper surface 68 of member 61 stabilize the central leaf-spring contactor in and out of positions of electrical contact. The soft iron segment 67 concentrate the magnetic forces around the fringe area thereby aiding in stabilization of the central leaf-spring contactor 60.

Upon further movement of the control magnet 71 to a position as shown in FIG. 17 there results a corresponding further movement of member 61. This causes central leaf-spring contactor 60 to pivot through a small arc and into electrical contact with the other flanking leaf-spring contactor 63. The electrical contact is maintained as long as the control magnet 71 remains in its position.

Thus, having described the operation and the cooperation of the various elements of the device shown in FIG. 10, it should be apparent that these concepts are the same as those present in the previous embodiments described and also in those embodiments yet to be described.

Figure 18:
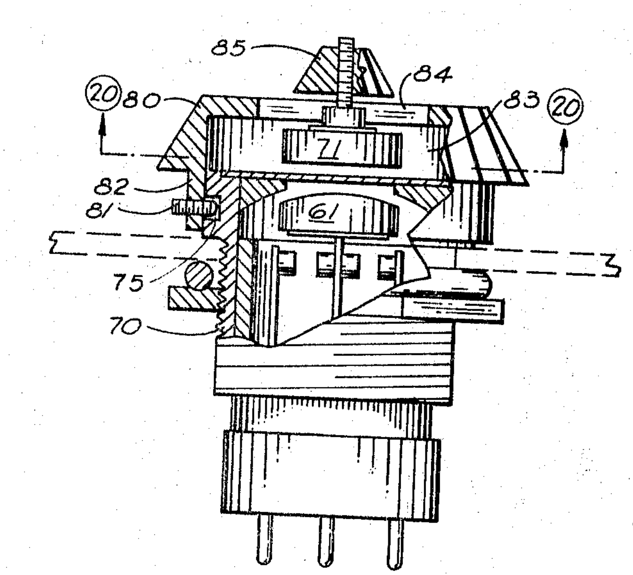
FIG. 18 is a view in partial section of the embodiment of the present invention shown in FIG. 10 wherein a control cap has been mounted on the hermetically sealed housing.
Figure 19:
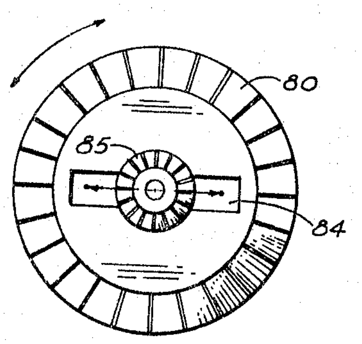
FIG. 19 is a top view of the control cap shown in FIG. 18.

In discussing the embodiment of the present invention throughout FIGS. 10 through 17, reference has been made to a control magnet 71 which has been movable on the exterior side of the hermetically sealed housing 70. FIG. 18 shows the manner in which this control magnet is mounted on the exterior of the sealed housing. A mounting cap 80 is attached in a rotatable manner to the hermetically sealed housing 70. Several suitable means for rotatably mounting the cap onto the housing will be apparent to those skilled in the art. The specific means shown comprises a threaded bearing member 81 which extends through the wall 82 of the cap and into a channel 75 formed in the exterior surface of the sealed housing. The mounting cap 80 defines an internal cavity 83 which houses the control magnet 71. The cap 80 also contains a slot 84 in the top thereof which allows a means for moving the control magnet to pass therethrough. The means for moving the control magnet 71 is merely a knob 85 mounted by a screw fitting to the upper surface of the control magnet. The control magnet may, therefore, be moved throughout its positions by merely sliding the knob 85 back and forth across the slot 84. This is indicated by the arrow shown in the top view illustrated in FIG. 19.

The control cap 80, just described, provides two methods of controlling the electrical switch of the present invention. The first method, of course, involves merely the sliding of the knob 85 and the attached control magnet 71 back and forth in slot 84 thereby causing a corresponding movement in member 61 located within the hemetically sealed housing.

Figure 20:
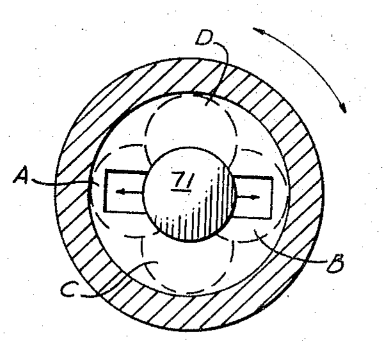
FIG. 20 is a view taken along line 20—20 of FIG. 18 showing the internal cavity of the control cap and the relative positioning of the control magnet therein.

The second method of control involves sliding the knob 85 and the attached control magnet 71 to one end of the slot 84 and securing it in that position. The control magnet 71 thus takes up a position corresponding with either A or B as shown in the sectional view in FIG. 20. These positions correspond to the electrical contacting positions as shown in FIGS. 13, 14, 15 and 17. By rotating the cap 80 through 90° the control magnet 71 assumes a new position indicated as C or D in FIG. 20. This position of the control magnet 71 corresponds to the position of the contactors as shown in FIG. 16.

It should be apparent that any combination of rotation of the cap 80 and sliding of the knob 85 may be employed to control the electrical switching mechanism of the present invention.

Figures 21, 22:
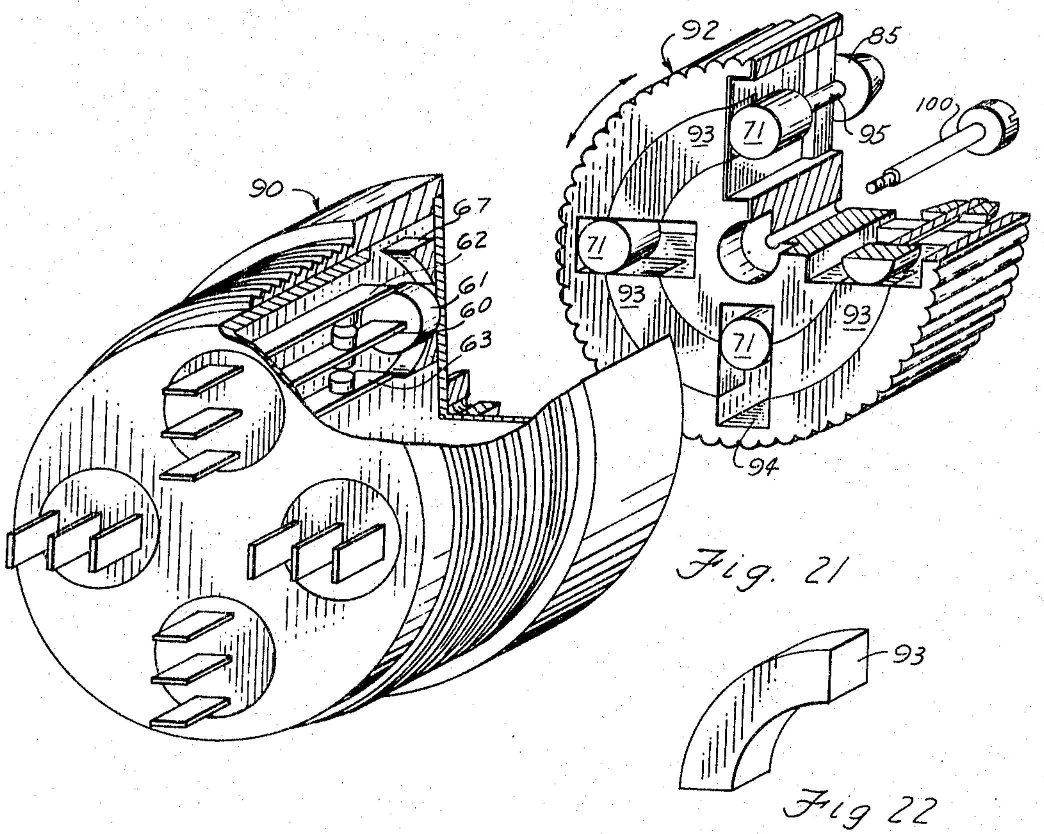
FIG. 21 is a perspective view in partial section of a hermetically sealed housing which contains four separate switches of the multiple leaf-spring type shown in FIG. 10 and has a rotatable control cap having four separate control magnets mounted therein.
FIG. 22 is a perspective view of one of the holding members shown in the control cap of FIG. 21.

Another embodiment of the present invention is illustrated in FIG. 21 wherein four of the multiple leaf-spring contactor switches are contained within a hermetically sealed cylindrical housing 90. Each of these switches is identical to those described in reference to FIGS. 10 through 18. Specifically, each comprises a central leaf-spring contactor 60 having mounted on its upper free end a member 61. Member 61 is made of a material which is responsive to magnetic forces and may or may not be magnetized. Flanking the central leaf-spring contactor 60 are two additional leaf-spring contactors 62 and 63.

A cap 92 is rotatably attached to the hermetically sealed cylindrical housing by means of the threaded axle 100. The cap has four equally spaced radial slots 94 wherein control magnets 71 are slidably positioned. Each control magnet is attached to a shaft 95 which extends outwardly from the slot on the face side of the cap 92. Attached to the outer end of the shaft 95 is a control knob 85 for slidably moving the control magnet back and forth within the slot. Arcuately arranged between the slots and interconnecting therewith are holding magnets 93 positioned so as to be flush with the bottom face of the cap 92. These holding magnets are arranged to define a circle whose radius is equal to the radius of the circle defined by the central leaf-spring contactors 60 mounted in the sealed housing 90. The bottom surface of these holding magnets 93 may have a magnetic polarity which produces forces of attraction between that surface and the members 61 of the switches mounted in the hermetically sealed housing 90 or, alternatively, they may not be magnetized at all. FIG. 22 illustrates one of the holding magnets.

In the operation of this embodiment the cap 92 is rotatably secured to the cylindrical sealed housing 90. Each of the slots 94 of the cap containing the control magnets may be aligned with a corresponding multiple leaf-spring contactor switch in the hermetically sealed housing. With the cap in this position each switch may be individually controlled by movement of the corresponding control magnet using knobs 85.

Figure 23:
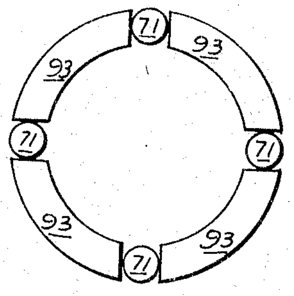
FIGS. 23 through 25 are views schematically illustrating some of the various settings of the control magnets within the control cap illustrated in FIG. 21.
Figure 24:
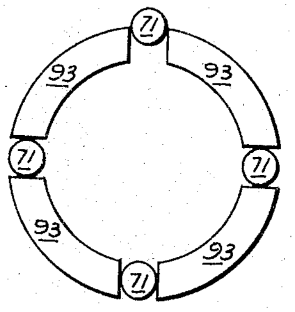
Figure 25:
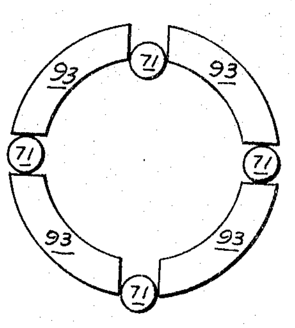

In an alternative operation, each control magneta 71 may be present in one or the other ends of its corresponding slot 94. Three typical pre-set arrangements are illustrated in FIGS. 23 and 25. By rotating the cap 92 a particular pre-set control magnet may be moved from one multiple leaf-spring contact switch to another. As a result, the multiple leaf-spring contact switches contained in the hermetically sealed housing 90 may be controlled in accordance with the sequence of the pre-set positions of the control magnets 71 contained within the cap 92.

It is during rotation of the cap 92 that the holding magnets 93 perform their function. When the control magnets move between the switches the holding magnets continually pass over them. Due to the arcuate contour of the holding magnets 93 the members 61 on the upper end of leaf-spring contactors 60 of the switches are maintained in a position wherein the contactors are separated until a subsequent control magnet becomes positioned over the switch. In this manner, positive control over the multiple leaf-spring contactor switches contained within the hermetically sealed housing 90 may be had at all times.

It should be apparent from the foregoing discussion that a hermetically sealed electrical switch may be externally controlled by means of magnetic forces without the danger of sparking. It will also be obvious to those skilled in the art that the present invention may take the form of other embodiments not specifically disclosed herein without departing from the spirit and scope of the invention and is therefore not to be limited except as defined in the appended claims.

What is claimed as invention is:

1. An electrical switching mechanism comprising:
(a) a housing;
(b) a plurality of first pairs of spaced contacts mounted within said housing, said pairs of contacts arranged in a circle;
(c) a plurality of second pairs of contacts movably positioned in said housing, each of said pairs positioned between one of said first pairs of contacts;
(d) a plurality of flexible actuator arms, each of said actuator arms being positioned between each of said first pairs of contacts, having a first end mounted in said housing, and a second end freely movable in said housing;
(e) first magnetic means mounted in each of said second ends of said actuator arms and having a surface of single magnetic polarity;
(f) a rotatable external cap mounted on said housing;
(g) a plurality of second magnetic means carried in said cap, each of said second magnetic means slidable along a radius of said cap, said second magnetic means equally spaced about said cap; and,
(h) an arcuate magnetic section carried by said cap between each of said second magnetic means and arranged to overlie said first magnetic means as said cap is rotated.

2. An electrical switching mechanism comprising:
(a) a housing;
(b) a first stationary contact within said housing;
(c) a resilient spring blade actuator arm having a first end pivotably positioned within said housing and a second end resiliently movable from a neutral position to an operating position within said housing;
(d) a second contact carried on said actuator arm within said housing for selective closure with said first contact when said actuator arm is in its operating position;
(e) first magnetic means attached to said resiliently movable end of said actuator arm and extending into an actuating zone, said first magnetic means having only a single magnetic surface of single magnetic polarity in said actuating zone; and,
(f) a second magnetic means external of said housing movable through said actuating zone, said second magnetic means having only a single polarity in close proximity with said surface of said first magnetic means in said actuating zone and said second magnetic means being movable through said actuating zone in a plane substantially perpendicular to said actuator arm in its neutral position.

3. An electrical switching mechanism as set forth in claim 2 wherein said surface of said second magnetic means is of like polarity with said surface of said first magnetic means.

4. An electrical switching mechanism as set forth in claim 2 wherein said surface of said second magnetic means is of opposite polarity with said surface of said first magnetic means.

5. An electrical switching mechanism as set forth in claim 2 wherein said second magnetic means has a first surface of like magnetic polarity with said surface of said first magnetic means and a second surface of opposite magnetic polarity from said surface of said first magnetic means, said first surface of like magnetic polarity and said second surface of opposite magnetic polarity selectively positionable in close proximity with said surface of said first magnetic means.

6. An electrical switching mechanism as set forth in claim 5 wherein said housing is hermetically sealed.

7. An electrical switching mechanism as set forth in claim 6 wherein that portion of said housing between said first magnetic means and said second magnetic means is non-magnetic.

8. An electrical switching mechanism as set forth in claim 6 wherein said housing has a soft iron core between said first magnetic means and said second magnetic means.

9. An electrical switching mechanism as set forth in claim 2 including a pair of first contacts fixedly mounted in said housing and a pair of second contacts carried on said actuator arm, said actuator arm being effective to selectively position each of said second contacts to close each of said second contacts with said first contacts.

10. A switching mechanism as set forth in claim 2 wherein said second magnetic means is slidably movable along a plane of motion substantially perpendicular to said actuating arm.

11. An electrical switching mechanism as set forth in claim 10 including a rotatable cap member externally mounted on said housing and slidably carrying said second magnetic means therein.

References Cited

UNITED STATES PATENTS

| | | | |
|---|---|---|---|
| 2,459,930 | 1/1949 | Fink. | |
| 2,637,115 | 5/1953 | Watson | 200—87 X |
| 2,770,697 | 11/1956 | Kellett | 200—87 |
| 2,977,468 | 3/1961 | Lovret | 200—87 X |
| 3,098,907 | 7/1963 | Reed et al. | 200—87 |
| 3,134,870 | 5/1964 | Reed et al. | 200—87 |
| 3,200,214 | 8/1965 | Aubert | 200—87 X |
| 3,383,274 | 11/1966 | De Falco | 335—206 |

FOREIGN PATENTS

| | | |
|---|---|---|
| 1,200,234 | 6/1959 | France. |

OTHER REFERENCES

Geiss et al.: German printed application 1,143,565, February 1963.

BERNARD A. GILHEANY, *Primary Examiner.*

R. N. ENVALL, Jr., J. BAKER, *Assistant Examiners.*